United States Patent
Dairokuno

[11] Patent Number: 6,089,358
[45] Date of Patent: Jul. 18, 2000

[54] TUBE-PRESSED BRAKE BAND

[75] Inventor: Satoshi Dairokuno, Shizuoka-ken, Japan

[73] Assignee: NSK-Warner K.K., Tokyo, Japan

[21] Appl. No.: 09/210,754

[22] Filed: Dec. 15, 1998

[30] Foreign Application Priority Data

Dec. 16, 1997 [JP] Japan ..................... 9-369945

[51] Int. Cl.⁷ ................................. F16D 51/00
[52] U.S. Cl. ................. 188/74; 188/77 R; 192/88 B
[58] Field of Search ................. 188/77 R, 77 W, 188/74, 78, 75, 76; 267/122; 192/88 B

[56] References Cited

U.S. PATENT DOCUMENTS 2,845,146  7/1958  Jones et al. ........................ 188/78
5,086,899  2/1992  Latsko .

FOREIGN PATENT DOCUMENTS 35-26215  10/1960  Japan .

*Primary Examiner*—Robert J. Oberleitner
*Assistant Examiner*—Lan Nguyen
*Attorney, Agent, or Firm*—Evenson, McKeown, Edwards & Lenahan, P.L.L.C.

[57] ABSTRACT

A tube-pressed brake band is arranged between inner and outer rings having a common center to stop rotation of one of the inner and outer rings as a counterpart by inflating a ring-shaped tube, which is inflatable in a radial direction of the brake band, into engagement with the counterpart. The tube-pressed brake band has a ring-shaped strap arranged between the counterpart and the tube and relative to an angular direction, is fixed at an end thereof on the other one of the inner and outer rings.

7 Claims, 5 Drawing Sheets

TUBE-PRESSED BRAKE BAND

BACKGROUND OF THE INVENTION a) Field of the Invention

This invention relates to a tube-pressed brake band suitable for use in an automatic transmission, brake or the like.

b) Description of the Related Art

As will be described next, binding means for conventional brake bands include those for pressing a bracket attached to one end of a strap and those for applying a pressure by a tube itself without using such a strap.

FIG. 7 shows a conventional brake band 50 of the bracket type, which is provided with a strap 51, an apply-side bracket 52, a piston 53 for pressing the apply-side bracket 52, an anchor-side bracket 54, and a friction material 55 bonded on an inner wall of the strap 51. Designated at numeral 56 is a counterpart inner member to be bound by the brake band 50.

In the brake band of this type, force tends to be applied locally to the brackets so that the brackets may develop cracks. The brake band of this type is accompanied by an inconvenience that any attempt to enhance the strength of the brackets leads to an increase in manufacturing cost.

FIG. 8 is a cross-sectional view of a conventional brake band 60 of the tube type, and FIG. 9 is a cross-sectional view of the conventional brake band 60 as taken along a line IX-O of FIG. 8. The brake band 60 of the tube type is provided with an outer frame 61, a ring-shaped tube 62, a friction material 63 bonded on an inner peripheral surface of the tube 62, and a hole 64 for feeding a pressure fluid into the tube 62. Designated at numeral 65 is a void space where an unillustrated inner member is accommodated as a counterpart.

By injecting or releasing a pressure fluid, for example, a gas such as compressed air or a liquid such as pressure oil into or from the tube 62 through the pressure fluid feed hole 64, the tube 62 is inflated or deflated to apply or release pressure. In conventional brake bands of the tube type, tubes are required to have substantial strength as torques are borne by the tubes themselves. Each tube must therefore be provided with a significant thickness, leading to an inconvenience in that the brake band cannot avoid a dimensional increase.

Incidentally, reference is had to FIG. 9. The torque capacity T of a brake band of the tube type is expressed by the following formula:

$$T = 2\pi \mu \cdot R_p \cdot R_f \cdot B \cdot P$$

where $\mu$: coefficient of friction $R_p$: pressure-receiving radius $R_f$: radius of friction surface B: pressure-receiving width P: pressure applied to the tube

SUMMARY OF THE INVENTION

To eliminate or reduce the above-described problems or inconveniences, the present invention provides a tube-pressed brake band for being arranged between inner and outer rings having a common center to stop rotation of one of the inner and outer rings as a counterpart by inflating a ring-shaped tube, which is inflatable in a radial direction of the brake band, into engagement with the counterpart, comprising:

a strap arranged between the counterpart and the tube and relative to an angular direction, fixed at an end thereof on the other one of the inner and outer rings.

Owing to the above-described construction of the tube-pressed brake band according to the present invention, the strap can lock the counterpart inner ring in a self-engaged state when a pressure fluid is injected into the tube to press the strap against the counterpart inner ring. Therefore, the tube is protected from loads and remains durable over an extended period. The tube-pressed brake band is provided with an increased torque capacity.

DETAILED DESCRIPTION OF THE INVENTION AND PREFERRED EMBODIMENT

Figure 1:
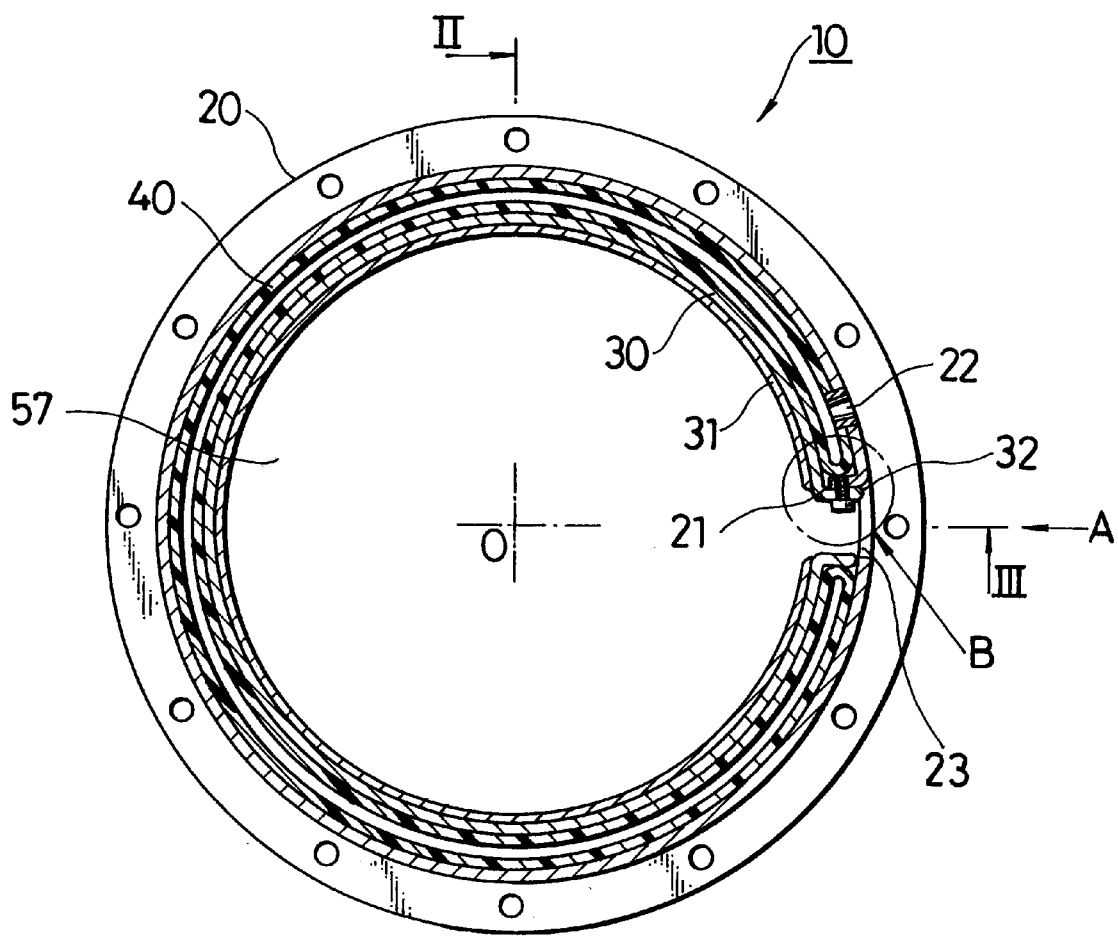
FIG. 1 is a cross-sectional (and partly side) view of a tube-pressed brake band according to a preferred embodiment of the present invention.
Figure 2:
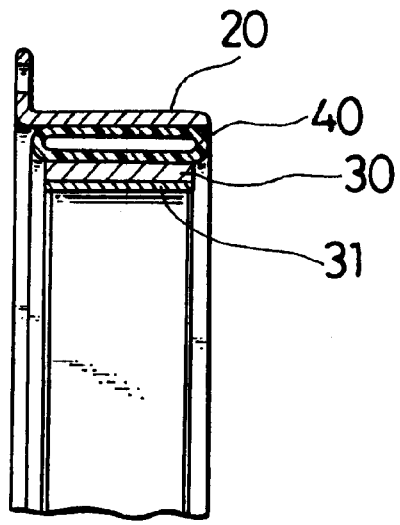
FIG. 2 is a fragmentary cross-sectional view of the tube-pressed brake band as taken along a line II-0 of FIG. 1.
Figure 3:
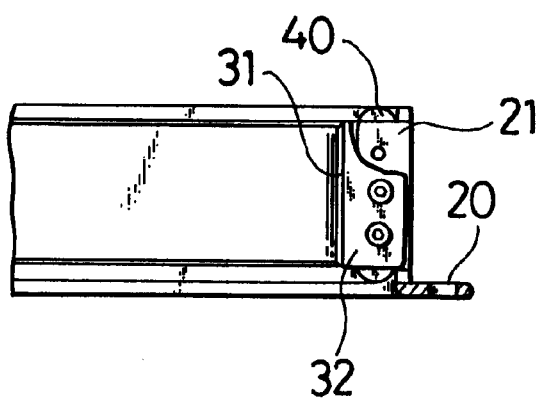
FIG. 3 is a fragmentary cross-sectional view of the tube-pressed brake band as taken along a line III-0 of FIG. 1.
Figure 4:
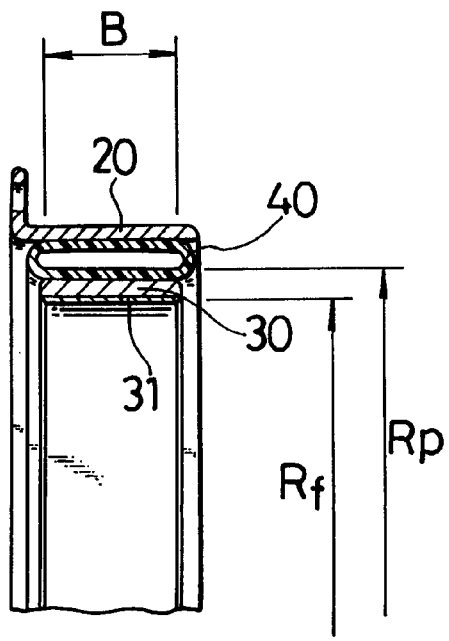
FIG. 4 is a fragmentary cross-sectional view similar to FIG. 2 but illustrates a tube with a pressure fluid injected therein.
Figure 5:
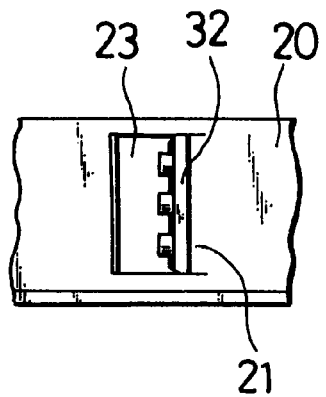
FIG. 5 is a front view of the tube-pressed brake band as viewed in the direction of A of FIG. 1.

With reference to FIGS. 1 through FIG. 6, the tube-pressed brake band according to the preferred embodiment of the present invention will hereinafter be described.

Designated generally at numeral 10 is the tube-pressed brake band according to the preferred embodiment of the present invention. The drawings illustrate an outer frame 20 as an outer ring; a folded portion 21 of the outer frame 20, said folded portion 21 having been formed by bending a portion of the outer frame 20 along an angular end of a tube 40 inwardly in a radial direction of the brake band 10; a pressure fluid feed hole 22; a cut-off portion 23 of the outer frame 20; a ring-shaped strap 30; a friction material 31 bonded on an inner peripheral wall of the strap 30; a folded portion 32 of the strap 30, said folded portion 32 having been formed by bending an angular end portion of the strap 30 outwardly in the radial direction of the brake band 10; and a slot 33, formed through the folded portion 32 so that a bolt 34 extends through the slot 33 and is maintained in threaded engagement with the folded portion 21.

As described above, the tube 40 is arranged as a discrete member on an outer periphery of the strap 30 which carries the friction material 31 bonded on the inner peripheral surface of the strap 30. The tube 40 therefore does not receive force directly but receives force via the strap 30, so that the tube 40 can remain free from angular force which would otherwise be applied from the counterpart to the tube 40. Further, the strap 30 is fixed at the one end thereof relative to the angular direction so that in a self-engaged state, the strap 30 receives torque from the counterpart. Further, the strap 30 is folded at opposite ends thereof toward the tube 40, thereby making it possible to prevent the tube 40 from extending out of the strap 30 and coming into direct contact with the counterpart even when the tube 40 is inflated.

Figure 6:
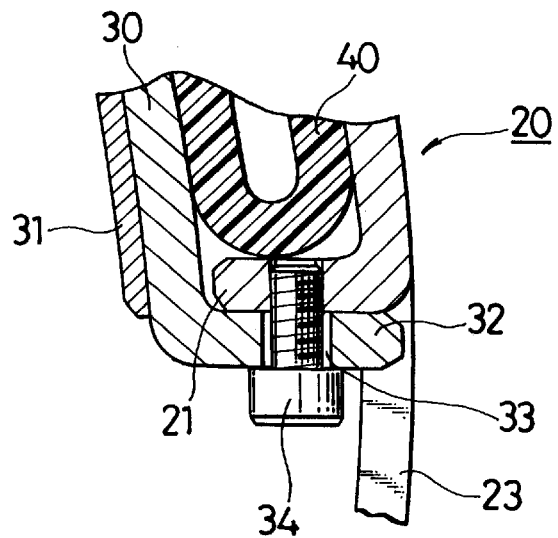
FIG. 6 is an enlarged view of a part indicated by a circle B of FIG. 1.
Figure 7:
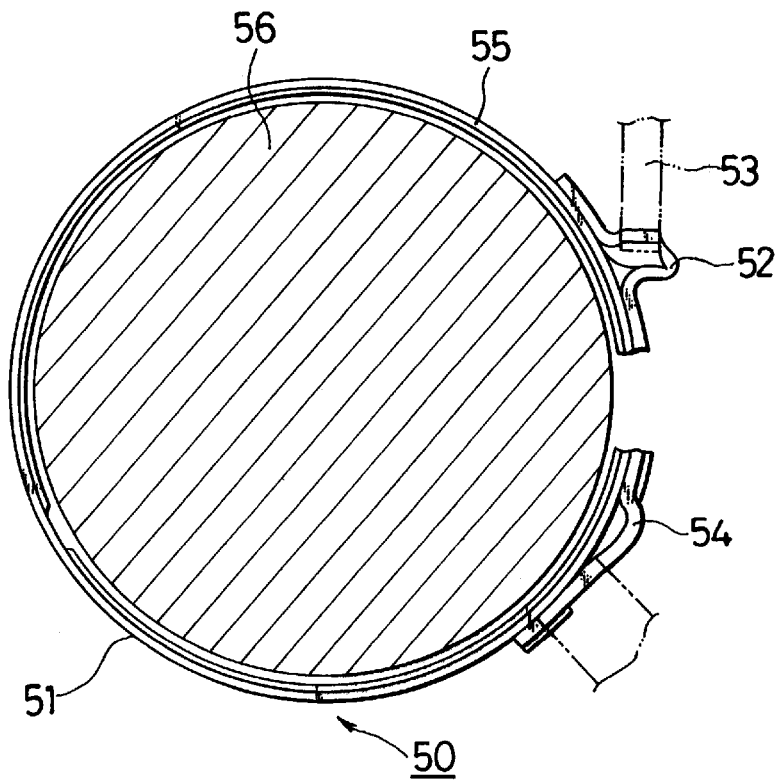
FIG. 7 is similar to FIG. 1 but illustrates a conventional brake band of the bracket type.
Figure 8:
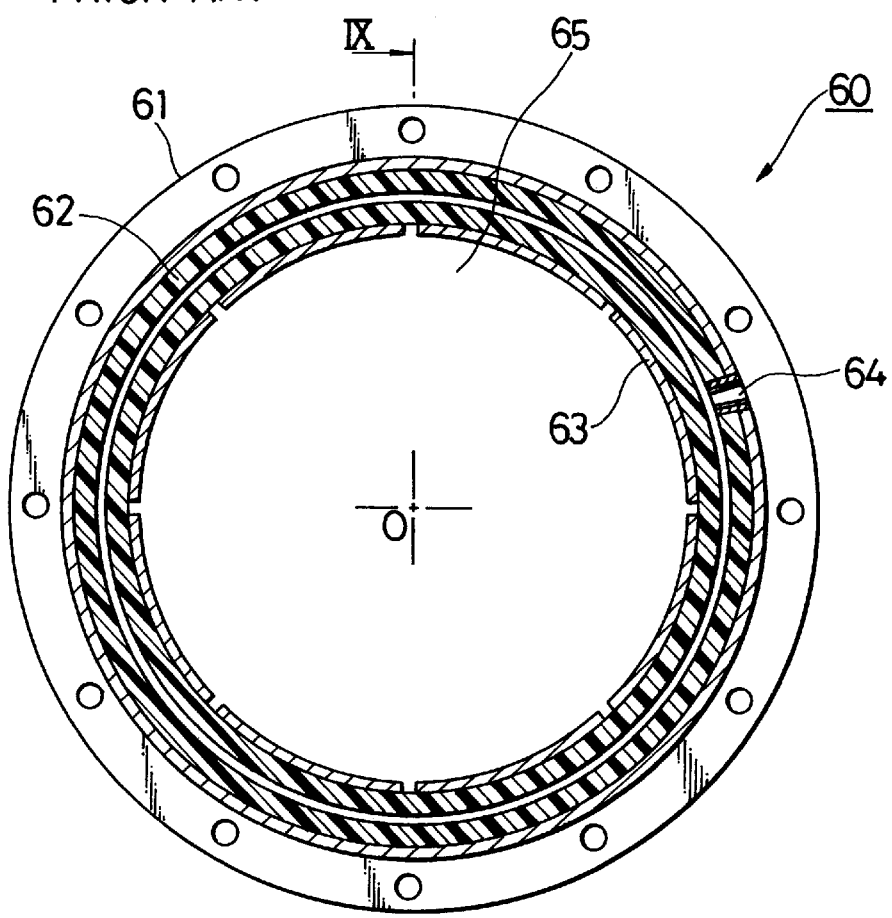
FIG. 8 is similar to FIG. 1 but illustrates a conventional brake band of the tube type.
Figure 9:
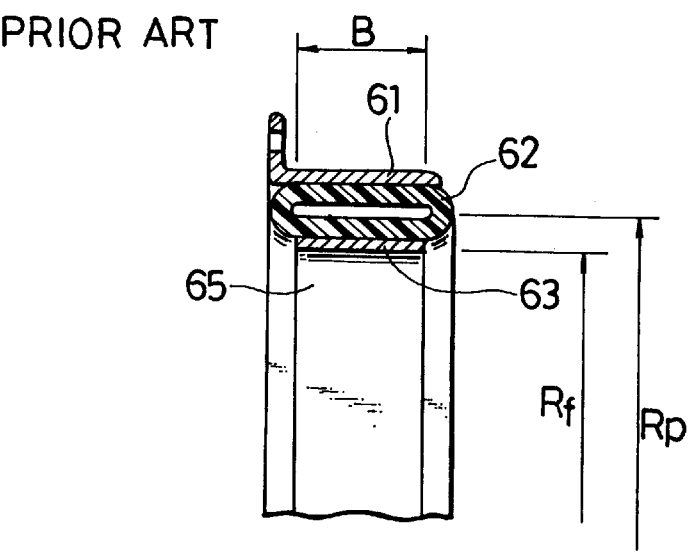
FIG. 9 is a cross-sectional view of the conventional brake band of the tube type as taken along a line IX-O.

As is appreciated from FIG. 6, the slot 33 has a diameter greater than the bolt 34 in the radial direction of the brake band 10, in other words, in a horizontal direction as viewed in FIG. 6. As a result, the strap 30 is fixed on the outer frame 20 in such a way that the strap 30 is allowed to undergo a radial play at the folded portion 32 thereof, namely, the angular end thereof. The strap 30 is therefore smoothly pressed against the counterpart even at the folded portion 32 thereof, whereby substantially uniform pressing force can be applied over the entire periphery of the strap 30. This has brought about the advantageous effect that the friction material 31 is protected from uneven wearing.

In the tube-pressed brake band 10 according to the present invention, the strap may be required to have a cut-off portion of a sufficient angular width at a part thereof in some instances to ensure the above-described self-engagement instead of arranging the strap along the entire periphery of a void space 57 where an unillustrated counterpart inner member, namely, an inner ring should be arranged. In this case, the torque capacity T is expressed by the following formula:

$$T=(e^{\mu\beta}-1)R_p \cdot R_f \cdot B \cdot P$$

where $\mu$: coefficient of friction $R_p$: pressure-receiving radius $R_f$: radius of friction surface B: pressure-receiving width P: pressure applied to the tube $\beta$: angle of wrap of band e: base for natural logarithms The tube-pressed brake band according to the present invention is provided with an increased torque capacity and its tube is exposed to reduced loads. The tube can therefore be formed with a smaller thickness while enjoying improved durability.

This application claims the priority of Japanese Patent Application No. HEI 9-369945 filed Dec. 16, 1997.

What is claimed is:

1. A tube-pressed brake band for arrangement between a frame defining one ring of inner and outer rings having a common center and another of said inner and outer rings formed as a counterpart to stop rotation of said counterpart by inflating a ring-shaped outer tube which is inflatable in a radial direction of said brake band, comprising:

a strap movable into engagement with said counterpart by inflation of the tube, arranged between said counterpart and said tube, and fixed relative to an angular direction at an end thereof on the one ring of said inner and outer rings, said strap having a folded portion at said end thereof by which said strap is adapted to be fixed to said outer ring.

2. A tube-pressed brake band according to claim 1, wherein said strap is folded at another end, opposite said end thereof, toward said tube.

3. A tube-pressed brake band according to claim 1, wherein at said one end, said strap is fixed with a play relative to said radial direction of said brake band.

4. A tube-pressed brake band according to claim 3, wherein said strap is folded at opposite ends thereof toward said tube.

5. A tube-pressed brake band according to claim 1, and further comprising a friction material bonded on said strap which engages said counterpart.

6. A tube-pressed brake band according to claim 3, wherein the strap includes a slot through which a bolt extends to fix said strap with said play relative to said radial direction of said brake band.

7. A tube-pressed brake band according to claim 6, wherein the slot has a diameter greater than the bolt to allow said play.

* * * * *